No. 619,882. Patented Feb. 21, 1899.
R. FÖLSCHE.
APPARATUS FOR ELEVATING GRAIN, &c.
(Application filed Apr. 12, 1898.)
(No Model.) 2 Sheets—Sheet 1.
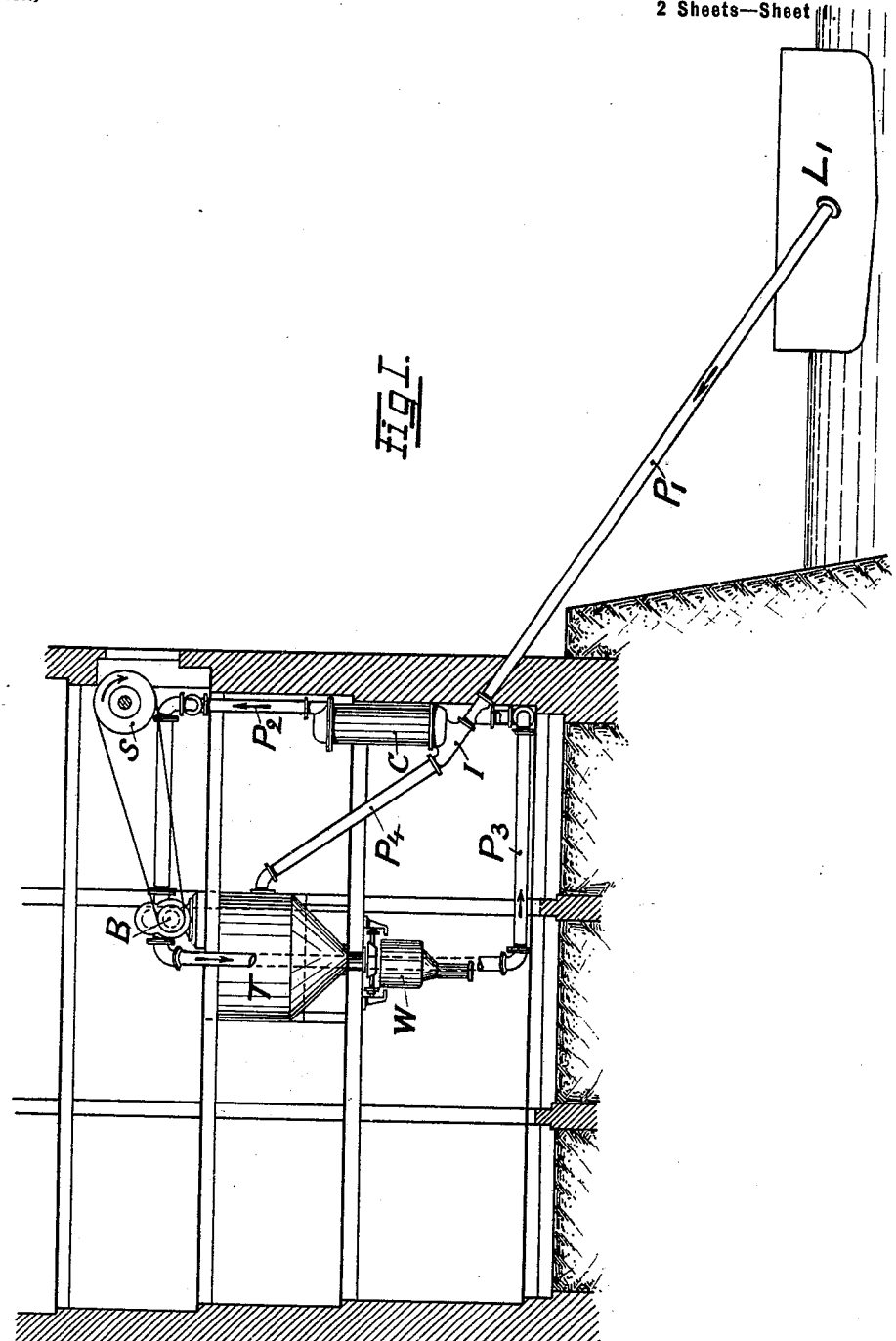
WITNESSES:
INVENTOR:
Rudolf Fölsche
By his Attorneys

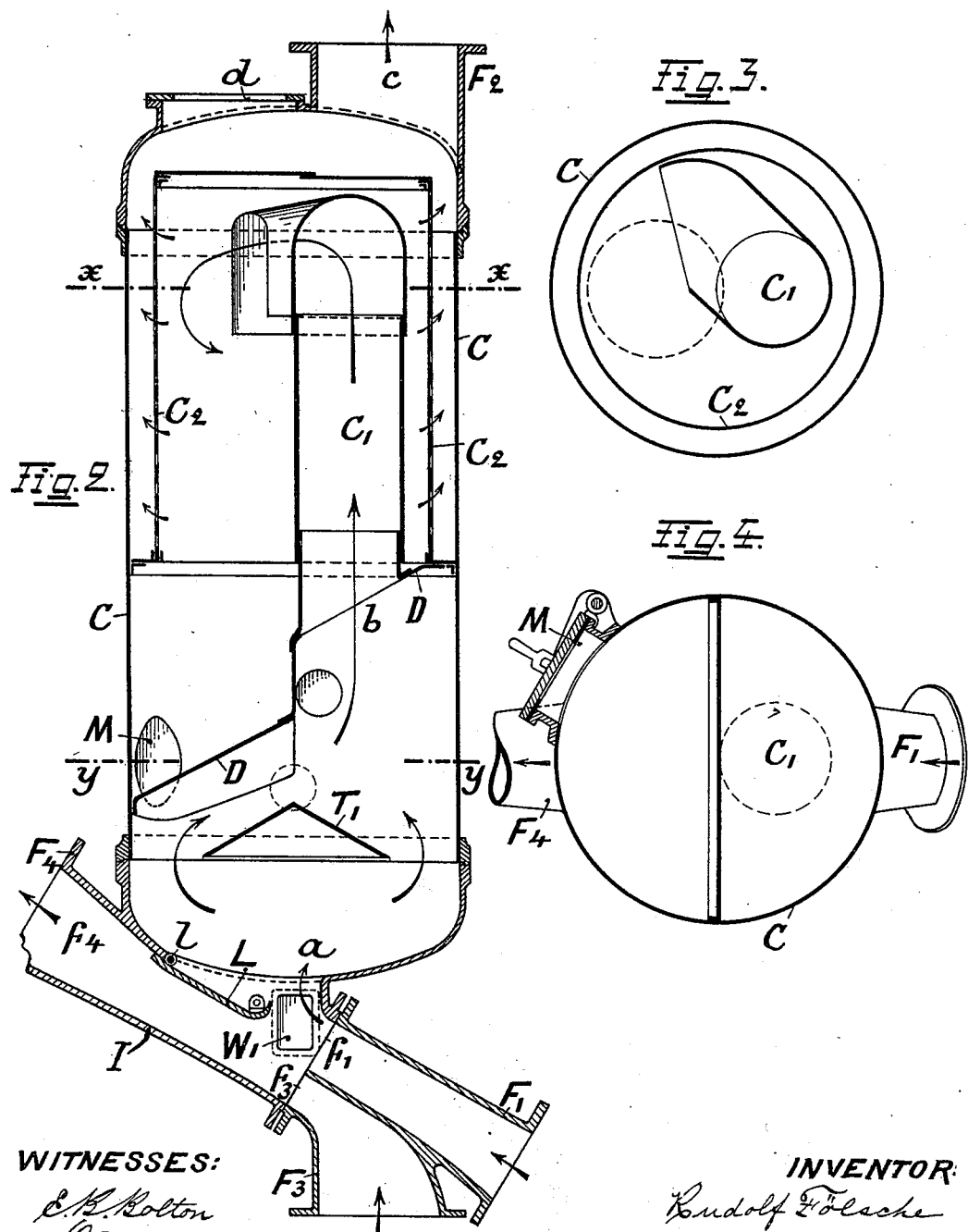

UNITED STATES PATENT OFFICE.

RUDOLF FÖLSCHE, OF HALLE-ON-THE-SAALE, GERMANY.

APPARATUS FOR ELEVATING GRAIN, &c.

SPECIFICATION forming part of Letters Patent No. 619,882, dated February 21, 1899.

Application filed April 12, 1898. Serial No. 677,339. (No model.)

*To all whom it may concern:*

Be it known that I, RUDOLF FÖLSCHE, a resident of Halle-on-the-Saale, Kingdom of Prussia, Germany, have invented certain new and useful Improvements in Apparatus for Elevating Grain and Similar Substances, of which the following is a specification.

This invention relates to an apparatus for transporting and elevating grain and similar substances.

The invention consists in the special arrangement of parts hereinafter particularly described, and pointed out in the claim.

Of the accompanying drawings, Figure 1 is a general view of the whole apparatus shown in a suitable position for action. Fig. 2 is a vertical section through that part of the apparatus which specially forms the subject of this invention shown on an enlarged scale. Fig. 3 is a horizontal section on line $xx$ in Fig. 2. Fig. 4 is a section on line $yy$ in Fig. 2.

The same letters of reference indicate the same parts in all the figures.

B is a blower or ventilator of any suitable type, driven by means of a belt from the sheave S.

L' is a lighter, shown in section and supposed to be filled with grain or a similar substance.

P' is a suction or feed pipe by which the material is sucked up from the lighter. $P^2$ is also a suction-pipe, which carries the air onto the blower.

$P^3$ is a pressure-pipe by which the air ejected by the blower is led into pipe P', and $P^4$ is a pipe by which the material is further elevated to the tank T, in which it is to be collected.

W is an automatic weighing apparatus of any suitable type.

I and C are the parts more especially forming the subject of my present invention and the interior arrangement of which is more fully shown in Figs. 2, 3, and 4. In these figures F' $F^2$ $F^3$ $F^4$ are studs provided with flanges which are supposed to be attached to the pipes P' $P^2$ $P^3$ $P^4$, Fig. 1, respectively. W is a window, by which the interior of the part I, which I will in future call the "injector," can be observed or cleaned. C is a cylinder, into which the pipe P' opens at $a$. T' is a small table or roof built over the opening $a$ and provided with edges sloping downward on all sides. The cylinder C is divided by the sloping partition D, which has a hole at $b$, and here a smaller cylinder C' is built up, which opens sidewise into the surrounding chamber at its upper end. The surrounding chamber is formed by a cylindrical sieve or filter $C^2$, made of wire-gauze or any other suitable material. At D a manhole M is provided in the cylinder C for the purpose of making the interior accessible. This hole, however, is closed when the apparatus is at work. At $a$ a lid or trap-door L is provided, pivoted at $l$. At $f^3$ the pipe $P^3$ is contracted, so as to form a nozzle; but the contraction is greater in the vertical dimensions than in the horizontal dimensions, so as to give the nozzle a flat shape and to make it fit the nozzle $f'$ of pipe P' closely and on as long a line as possible. The pipe P' is not contracted at $f'$, but only flattened out, so that the stream of material coming up P' will not increase its velocity at $f'$. In the same way any section through $f^4$ has the same area throughout, though the vertical dimensions vary as the stream proceeds from $f'$ and $f^3$ to $f^4$.

A special feature of my apparatus consists in this, that the lower part of the tube $P^4$, where it is struck by the jet of air issuing from the blast-nozzle $f^3$, has a convex shape. By this means the material that is being carried along by the stream of air cannot settle down and form a heap at this place, thus blocking the way or at any rate forming a frictional hindrance.

The operation of my invention will be most fully understood by explaining the action of the modification shown in Figs. 2 to 4. It should be remembered that F' is connected with the suction or feed pipe leading up from the lighter F', with the pressure-pipe coming from the blower $F^4$, with the pressure-pipe leading to the tank T, and $F^2$ with the suction-pipe leading to the blower. Therefore when the blower is started the air will take the following course: It will pass through $P^3$ and will form a jet of increased velocity at $f^3$, carrying along with it the stream of material that is being sucked up from the lighter and is issuing from the feed-nozzle $f'$. The air that rises up in pipe P' and brings the stream of material up will likewise issue at $f'$; but as the cylinder C is fully closed and as at $F^2$ the suction-pipe $P^2$ is attached to it the air will be sucked up through $a$ and will issue into the interior of the cylinder C. The opening $a$ is made so as to have a larger area than the section of $F'$. Therefore the stream of air issuing from $f'$ will experience a retardation at $a$, and thus the material carried along with this stream of air will be allowed to drop at this point and will therefore fall down and join the air-current issuing from $f^3$. This action is also seconded by the trap-door L, which partly intercepts the current of material coming up through $f'$. However, part of the material, and especially those parts that have a smaller specific gravity than the rest, will nevertheless tend to rise up at $a$ and will squirt up into the interior of the cylinder C like a fountain; but as soon as the current of air issues fairly into the interior of the cylinder C its motion will be all but arrested, and all the heavier parts of the material carried along with it will either fall down spontaneously and join the stream issuing through $f^4$ or else will strike against the lower surface of the table $T'$ and will be reflected downward from thence. The dust and husks, however, will be carried along with the stream of air in the way indicated by the arrows. The lateral opening at the top of the cylinder $C'$ will cause the air to circulate as it passes out into the interior of the cylindrical sieve $C^2$, whereby those particles that may still be suspended in it will be precipitated and will fall down and collect on the sloping partition D, whence they can be removed from time to time by means of the manhole M. The stream of air itself will pass on through the sieve $C^2$, depositing on its surface the last of the particles of dust or husks still suspended in it and will finally issue at $F^2$ and proceed to the blower.

I desire it to be understood, however, that I do not restrict my invention to any special constructive details, the main difference between my above-described apparatus and other similar devices that have hitherto been used for the same purpose being that in my apparatus I impart the motion to the air in the transporting-pipes by means of an injector-like nozzle laterally introduced into the pipe itself at a suitable place. Thus I obtain the advantage that my apparatus acts continuously, whereas in similar devices hitherto used the suction-pipe of the blower was attached directly to the pipe drawing the material from the lighter or the like, the consequence being that the operation had to be periodically interrupted whenever one tank was filled.

Having now particularly described and ascertained the nature of my said invention and in what manner the same is to be performed, I declare that what I claim is—

A grain-conveyer comprising a receptacle C, an injector communicating therewith, a suction-pipe connecting with said injector, a pressure-pipe connecting with said injector, a delivery-pipe also connected with the injector, and a pipe for leading the air away from the receptacle C, substantially as described.

In witness whereof I have hereunto set my hand in presence of two witnesses.

RUDOLF FÖLSCHE.

Witnesses:
 HEINRICH FÖLSCHE,
 HERMANN WERNECHE.